(12) United States Patent
Stahl et al.

(10) Patent No.: US 7,375,772 B2
(45) Date of Patent: *May 20, 2008

(54) COLOR VIDEO PROJECTION SYSTEM EMPLOYING REFLECTIVE LIQUID CRYSTAL DISPLAY DEVICES

(75) Inventors: Kurt Stahl, Lake Oswego, OR (US); Jeffrey A. Gohman, Hillsboro, OR (US)

(73) Assignee: Straight Signals LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/397,913

(22) Filed: Apr. 3, 2006

(65) Prior Publication Data

US 2006/0238665 A1  Oct. 26, 2006

Related U.S. Application Data

(63) Continuation of application No. 10/696,297, filed on Oct. 28, 2003, now Pat. No. 7,072,003, which is a continuation of application No. 09/535,427, filed on Mar. 23, 2000, now Pat. No. 6,661,475.

(51) Int. Cl.
*G02F 1/1335* (2006.01)
*G03B 21/28* (2006.01)

(52) U.S. Cl. .......................... 349/5; 353/31
(58) Field of Classification Search ............. 349/5–9; 353/20, 31–33
See application file for complete search history.

(56) References Cited

U.S. PATENT DOCUMENTS

| | | | |
|---|---|---|---|
| 5,530,489 A | 6/1996 | Henderson et al. | 348/757 |
| 5,577,826 A | 11/1996 | Kasama et al. | 353/31 |
| 5,777,789 A | 7/1998 | Chiu et al. | 359/494 |
| 6,010,221 A | 1/2000 | Maki et al. | 353/33 |
| 6,113,239 A | 9/2000 | Sampsell et al. | 353/31 |
| 6,190,013 B1 | 2/2001 | Tani et al. | 353/31 |
| 6,247,814 B1 | 6/2001 | Lin | 353/20 |
| 6,661,475 B1 * | 12/2003 | Stahl et al. | 349/9 |
| 6,803,972 B1 | 10/2004 | Budd et al. | 349/9 |
| 7,072,003 B2 * | 7/2006 | Stahl et al. | 349/5 |

OTHER PUBLICATIONS

"High Brightness Color Liquid Crystal Display Projector", IBM Technical Disclosure Bulletin, vol. 40, No. 12, Dec. 1997, pp. 165-167.

Bone et al. "Novel Optical System Design for Reflective CMOS Technology", SPIE Conference on Projection Displays V, Jan. 1999, vol. 3634, pp. 80-86.

* cited by examiner

*Primary Examiner*—Dung T. Nguyen
(74) *Attorney, Agent, or Firm*—Perkins Coie LLP

(57) ABSTRACT

A system including a light source, a polarizing beam splitter, and first, second and third light valves is provided. The light source produces light in first, second and third wavebands in a second polarization direction. The beam splitter transmits the first waveband of light in a first polarization direction and the second and third wavebands of light in the second polarization direction. The first, second and third light valves reflect at least a portion of the respective first, second and third wavelength bands of light generally toward a projection lens.

33 Claims, 2 Drawing Sheets

COLOR VIDEO PROJECTION SYSTEM EMPLOYING REFLECTIVE LIQUID CRYSTAL DISPLAY DEVICES

CROSS-REFERENCE TO RELATED APPLICATIONS

The present application is a continuation of U.S. application Ser. No. 10/696,297, entitled, COLOR VIDEO PROJECTION SYSTEM EMPLOYING REFLECTIVE LIQUID CRYSTAL DISPLAY DEVICES, filed Oct. 28, 2003 now U.S. Pat. No. 7,072,003, which is a continuation of U.S. application Ser. No. 09/535,427, entitled COLOR VIDEO PROJECTION SYSTEM EMPLOYING REFLECTIVE LIQUID CRYSTAL DISPLAY DEVICES filed Mar. 23, 2000, now U.S. Pat. No. 6,661,475, issued Dec. 9, 2003.

TECHNICIAN FIELD

This invention relates to color video projection display systems and more particularly to optical pathway components for use in projection systems employing reflective liquid crystal on silicon ("LCOS") light valves.

BACKGROUND OF THE INVENTION

Multimedia projection systems have become popular for purposes such as conducting sales demonstrations, business meetings, and classroom training. In typical operation, multimedia projection systems receive analog video signals from a personal computer and convert the video signals to digital information to control one or more digitally driven light valves. Depending on the cost, brightness, and image quality goals of the particular projector, the light valves may be of various sizes and resolutions, be transmissive or reflective, and be employed in single or multiple light path configurations.

Recently, more optimal sets of multimedia projector characteristics have been achieved by employing reflective LCOS light valves. There are five general architectures for employing reflective LCOS light valves. The first employs a polarization beam splitter ("PBS") cube prism and a so-called Philips prism; the second employs a PBS cube prism, a dichroic prism, and spectrally selective wave plates; the third employs multiple PBS cube prisms; the fourth employs a PBS cube prism and tilted plates; and the fifth employs an off-axis design implemented with linear polarizers, as opposed to PBS cube prisms. For each architecture, a number of variations exist, such as using crossed plates for color separation versus a solid "X cube" prism color separator, using liquid filled PBS cubes instead of glass PBS cubes, and using additional polarizers or wave plates. However, each of the five architectures is generally distinct from the others and from the invention described herein.

All of the above architectures employ linear polarized light-sensitive devices for receiving light from a light source, reflecting the light off the LCOS light valves, and redirecting the reflected light, depending on its polarization direction, either out through a projection lens or back toward the light source. The polarization direction of the light is determined by an electronic image pattern applied to the LCOS light valve. To achieve a dark polarization direction, selected LCOS light valve pixels do not change the reflected light polarization direction, so the light returns to the light source and does not project toward the screen. To achieve an illuminated polarization direction, selected LCOS light valve pixels rotate the polarization direction by 90°, so the light is directed through the projection lens toward the screen. Projected image quality largely depends on how well the various optical path components establish, maintain, and analyze the light polarization directions. Image brightness largely depends on minimizing light loss through the various optical path components and polarizers.

In particular, the architecture employing a PBS cube prism and a Philips prism is described in U.S. Pat. No. 5,777,789 for EFFICIENT OPTICAL SYSTEM FOR A HIGH RESOLUTION PROJECTION DISPLAY EMPLOYING REFLECTION LIGHT VALVES, in which a cube PBS allows only linearly polarized light to propagate to a color splitting/combining prism. After reflecting from the light valves, the light is "analyzed" by the PBS cube and redirected according to the polarization direction of the analyzed light. This architecture is disadvantageous because it requires sophisticated optical coatings and non-standard prism angles and has skew ray depolarization caused by the PBS cube prism, stress birefringence caused by long path lengths in glass elements, and considerable weight due to the bulky prisms.

In the architecture employing a PBS cube prism, a dichroic prism, and spectrally selective wave plates, linearly polarized light is first incident on a spectrally selective half-wave plate that changes the polarization direction by 90° for one color band only. A PBS cube separates the rotated color band from the unrotated color bands based on their orthogonal polarization directions. Typically the green band is selected as the rotated color band because a dichroic cube splitter relatively easily separates the widely spaced wavelengths of the blue and red bands. After reflection from the light valves, the PBS cube analyzes the light, directs it according to its polarization direction, and recombines the color bands. Because the PBS cube has a non-ideal spectral response, a spectrally selective half-wave plate is required at the output face of the PBS cube so that all three color bands have the same polarization direction after passing through the wave plate and can, therefore, all pass through a "clean-up" polarizer. This architecture is disadvantageous because of stress birefringence caused by the large path lengths in glass, skew ray depolarization caused by the PBS cube prism, and considerable weight due to the bulky prisms.

In the architecture employing multiple PBS cube prisms, light is separated into red, green, and blue light paths using dichroic filter plates. Each of the three color paths contains a PBS cube, and each PBS cube allows only linearly polarized light to pass through to an associated light valve. Light reflected from the light valves is "analyzed" by the respective PBS cube and redirected according to the polarization direction of the analyzed light. For each color path, light propagating toward the projection lens is recombined with light from the other color paths via an X-cube prism. This architecture is disadvantageous because of considerable aggregate weight of the three PBS cube prisms and the X-cube prism, high component cost and complexity, stress birefringence, skew ray depolarization in the PBS cube prisms, and a large footprint created by the separated color paths.

In the architecture employing a PBS cube prism and tilted plates, the PBS cube prism allows only linearly polarized light to propagate toward a set of tilted dichroic filter plates. The first plate reflects one color band and passes the remaining light to the second dichroic filter plate, where it is further split into two more color bands. After reflection from the light valves, the color bands of light retrace their paths and recombine via the color splitting plates. The light is subsequently "analyzed" by the PBS cube, and redirected according to the polarization direction of the analyzed light. This architecture is disadvantageous because the PBS cube prism is bulky, heavy, has stress birefringence, and skew ray depolarization, and the projection lens requires a long back working distance.

The architecture employing an off-axis design and linear polarizers is described in "projection Displays V," *SPIE Proceedings,* January 1999, Vol. 3634, pp. 80-86. This architecture employs a two-level arrangement in which the incoming light propagates upwardly at an angle and through crossed dichroic color splitting plates. A sheet type linear polarizer positioned in each color path polarizes the light. The polarized light continues to propagate upwardly and reflects off the light valves. The polarization direction of the light is analyzed by another sheet type linear polarizer in each color path Light reflected by dark polarization direction pixels undergoes absorption in the polarizer, and light reflected by illuminated polarization direction pixels propagates through the polarizer to an X-cube prism color combiner. This architecture is disadvantageous because it has an unduly high-profile, two-level form factor and requires an proprietary, asymmetrical, off-axis projection lens.

What is needed, therefore, is a compact, low-profile multimedia projection system that achieves a bright, high-quality projected image at a relatively low cost.

SUMMARY OF INVENTION

An object of this invention is, therefore, to provide a reflective LCD light valve-based multimedia projector.

Another object of this invention is to provide a multimedia projector that is lighter weight, more compact, potentially less costly, and of simpler optical design than prior prism based projectors.

A further object of this invention is to provide a multimedia projector having a three-path reflective light valve assembly that requires no prisms to form multi-color images.

Still another object of this invention is to provide a multimedia projector that has a simplified optical system employing a plate-type transflective polarizing beam splitter, spectrally selective waveplates, and a dichroic filter.

The following descriptions of preferred embodiments of this invention refer to P-polarized light and S-polarized light. P-polarized light has a polarization pass orientation in the plane of incidence and reflection, and S-polarized light has a polarization pass orientation that is parallel to the surface of an optical element, i.e., is orthogonal to the plane of incidence and reflection.

A first preferred embodiment of an image projector of this invention includes a light source that illuminates a three-path reflective LCD assembly that produces images for projection by a projection lens. The light source provides S-polarized light rays that are received by a spectrally selective input wave plate that changes a first wavelength range of light rays to P-polarized light rays and propagates without polarization change second and third wavelength ranges of light rays A plate-type transflective polarizing beam splitter transmits the P-polarized first wavelength range light rays and reflects the S-polarized second and third wavelength range light rays. The P-polarized first wavelength range light rays propagate through a field lens and impinge on a first reflective LCD light valve. The S-polarized second and third wavelength range light rays strike a pleochroic, and preferably dichroic, filter, which splits them into second and third wavelength range light rays that propagate through field lenses and impinge on respective second and third reflective LCD light valves.

The P-polarized first wavelength range light rays impinging on dark state pixels of the first LCD light valve are reflected without changing polarization direction and return along their original paths through the transflective polarizing beam splitter toward the light source. The S-polarized second and third wavelength range light rays impinging on dark state pixels of the respective second and third LCD light valves are reflected without changing polarization direction, are recombined by the dichroic filter, and return toward the light source by reflecting off the transflective polarizing beam splitter.

The P-polarized first wavelength range light rays impinging on illuminated state pixels of the first LCD light valve are reflected with a 90° change in polarization direction and are reflected toward the projection lens by the transflective polarizing beam splitter. The S-polarized second and third wavelength range light rays impinging on illuminated state pixels of the respective second and third LCD light valves are reflected with a 90° change in polarization direction, are recombined by the dichroic filter, and transmit through the transflective polarizing beam splitter toward the projection lens.

The first, second, and third wavelength ranges of light subsequently propagate to a spectrally selective output wave plate that changes the S-polarized first wavelength range of light to P-polarized light, but does not change the polarization states of the second and third wavelength ranges of light. After propagating through the spectrally selective output wave plate, all three wavelength ranges of light have substantially the same polarization direction. A "clean-up" linear polarizer oriented with its transmission axis parallel to the first, second, and third wavelengths of light blocks any light having an undesired polarization direction resulting primarily from non-ideal light transmission and reflection characteristics of the transflective polarizing beam splitter.

A second preferred embodiment of an image projector of this invention includes an optical system that is constructed similarly to the first embodiment but employs randomly polarized light from the light source and does not require the spectrally selective input wave plate. Accordingly, the randomly polarized light rays propagate toward the transflective polarizing beam splitter, which propagates P-polarized ones of the light rays toward a first field lens, and reflects S-polarized ones of the light rays toward a dichroic filter. The dichroic filter transmits S-polarized first and second wavelength range light rays toward the second field lens and reflects S-polarized third wavelength range light rays toward the third field lens.

The light paths associated with the field lenses each include an optional dichroic trim filter placed in the path of the associated LCD light valves. The trim filters reflect selected wavelength ranges of light rays to perform a color balancing function without changing their polarization directions, so the reflected light simply returns toward the light source. Light rays having the desired wavelength range transmit through the trim filters for reflection by pixels of the LCDs light valves. In this way each of the three LCD light valves receives and reflects its respective one of the first, second, and third wavelength ranges of light rays. The remainder of the second embodiment is constructed similarly to the first embodiment.

This invention is advantageous because it enables constructing a reflective LCD light valve-based multimedia projector that is lighter weight, more compact, potentially less costly, and of simpler optical design than prior prism based projectors. The system is lighter because no bulky prisms are required, more compact because it requires only one dichroic filter and a polarizing beam splitter, and less costly because the optical component count is low and there are no prisms.

This invention is further advantageous because it allows construction of a projector that is less subject to contrast degradation due to birefringence problems caused by residual or thermally induced stresses.

Additional objects and advantages of this invention will be apparent from the following detailed description of preferred embodiments thereof that proceed with reference to the accompanying drawings.

BRIEF DESCRIPTION OF EMBODIMENTS

DETAILED DESCRIPTION OF PREFERRED EMBODIMENTS

Figure 1:
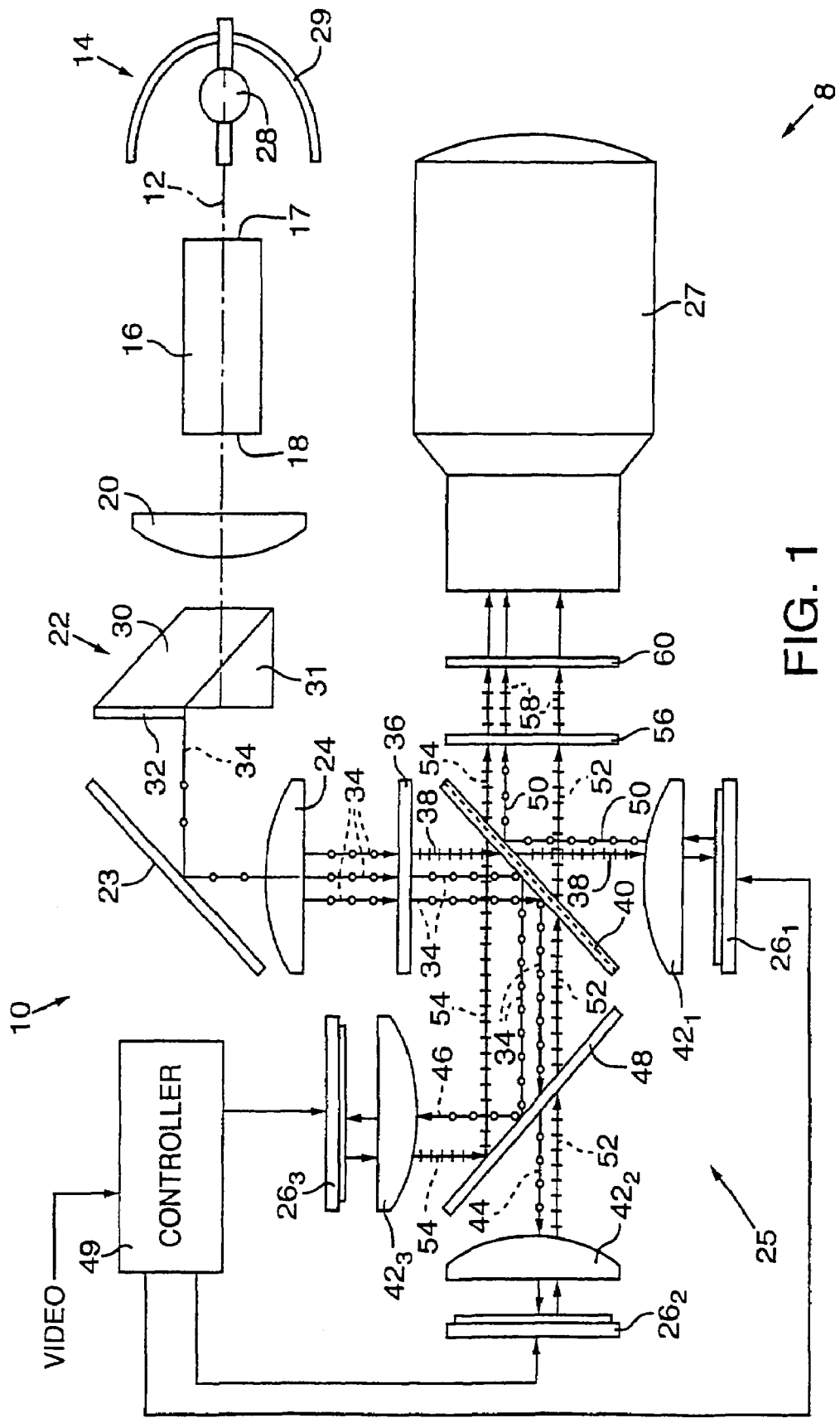
FIG. 1 is a simplified pictorial plan view of a multimedia projector showing a first embodiment of a projector optical system of this invention.

FIG. 1 shows an image projector 8 having an optical system 10 designed in accordance with a first embodiment of this invention and enclosed in and supported by a housing (not shown). Optical system 10 is constructed along an optical axis 12 and includes a light source 14; a light pipe optical integrator 16 having an inlet end 17 and an outlet end 18; a first positive lens 20; a polarization conversion prism assembly 22; a fold mirror 23; a second positive lens 24; a three-path reflective LCD assembly 25 that includes first, second, and third liquid crystal displays ("LCDs") $26_1$, $26_2$, and $26_3$ (collectively "LCDs 26"); and a telecentric-type projection lens 27. LCDs 26 are preferably about 15 millimeter (0.6 inch), reflective LCOS light valves employing twisted neumatic liquid crystal material, which is optically active. Of course, other types of liquid crystal materials, such as birefringent or optical retardation types, may be adapted for use with this invention.

Light source 14 includes a short arc lamp 28 mounted at a focus of an elliptical reflector 29. An optional meniscus lens (not shown) may be placed between elliptical reflector 29 and optical integrator 16 to concentrate the light propagating from light source 14 and striking inlet end 17. Optical integrator 16 is an elongated tunnel-type integrator with squared-off flat inlet and outlet ends 17 and 18. Optical integrator 16 is located such that its inlet end 17 is at the "point of least confusion" of elliptical reflector 29. The point of least confusion is the point where a light ray bundle reflecting from elliptical reflector 29 has the smallest spot size. Inlet and outlet ends 17 and 18 of optical integrator 16 have 3×4 cross-sectional aspect ratios that provide a 3×4 projection display format that is compatible with conventional SVGA and XGA display addressing formats. Of course, optical integrator 16 may be constructed to support other display formats, such as 9×16 (HDTV) and 5×4 (SXGA). Moreover, multiple integrators having different cross-sectional aspect ratios may be arranged for selective positioning into optical axis 12 to provide selectable projection display formats.

Optical integrator 16 preferably has cross-sectional and length dimensions that are optimized according to the magnification necessary to provide the proper illumination dimensions and f-number at LCDs 26. This permits a very compact optical system. Of course, fly-eye lens systems may be used with this invention.

First positive lens 20 receives and collimates light propagating from outlet end 18 of optical integrator 16. Polarization conversion prism assembly 22 is of conventional construction, including a 45° rhomboid prism 30, a right-angle triangle prism 31, and a half-wave plate 32. Fold mirror 23 receives S-polarized light rays 34 from polarization conversion prism assembly 22 and reflects them toward second positive lens 24, which receives the reflected S-polarized light rays 34 and transmits them toward three-path reflective LCD assembly 25. (S-polarized light rays are indicated in the drawing figures by small open circles connected together by a line representing a light propagation path.)

The S-polarized light rays 34 are received by a spectrally selective input wave plate 36, which transmits with polarization direction change a first wavelength range of light rays 34 to form P-polarized light rays 38 and transmits without polarization direction change second and third wavelength ranges of light rays 34. (P-polarized light rays are indicated in the drawing figures by short-length transverse lines intersecting a line representing a light propagation path.) Spectrally selective wave plate 36 is preferably of an optical retardation type.

A plate-type transflective polarizing beam splitter 40 transmits the P-polarized first wavelength range light rays 38 and reflects the S-polarized second and third wavelength range light rays 34. (Transflective polarizing beam splitters direct and recombine all the wavelength ranges of incident light rays according to their directions of polarization. S-polarized light rays are reflected, and P-polarized light rays are transmitted.) P-polarized first wavelength range light rays 38 propagate through a field lens $42_1$ and impinge telecentrically on first LCD $26_1$, and S-polarized second and third wavelength range light rays 34 impinge on a pleochroic color filter 48, which divides them to form second and third wavelength range light rays 44 and 46. Second and third wavelength range light rays 44 and 46 propagate through respective field lenses $42_2$, and $42_3$ and impinge telecentrically on respective second and third LCDs $26_2$, and $26_3$. (Field lenses $42_1$, $42_2$, and $42_3$ are referred to collectively hereafter as "field lenses 42".)

To correct astigmatism, pleochroic color filter 48 is preferably fabricated as a dichroic coating on one of the mated inner surfaces of a beam splitting cube. Alternatively, to eliminate a prism, color filter 48 may be fabricated as a dichroic coating formed on the light input surface of a plate of float glass.

Skilled workers will recognize that suitable optical retarders, polarizers, wave plates, transflective polarizing beam splitters, pleochroic filters, field lenses, and LCD light valves are available from a variety of manufacturers including ColorLink, Inc. of Boulder, Colo.; Moxtek, Inc. of Orem, Utah; and Sharp Corporation of Nara, Japan Transflective polarizing beam splitter 40 is preferably of a diffractive wire grid type, but acceptable alternatives include transflective polarizing beam splitters formed from multi-layer thin films, cholesteric polymer liquid crystals, and laminated polymer sheets. The latter type consist of laminating together multiple thin polymer sheets, each having a different index of refraction, such as "DBEF" sheets available from 3M.

Each of LCDs 26 includes an array of pixels that are individually controllable by a controller 49 that receives video information from analog or digital signal sources, such as a personal computer. Skilled workers will understand that controller 49 interprets the video information and conveys to LCDs 26 pixel image patterns that control each pixel to reflect light in one of two orthogonal polarization directions depending on whether the pixel is switched to a dark state or an illuminated state. Pixels in the dark state reflect incident light rays without change in polarization direction, and pixels in the illuminated state reflect incident light rays with a 90° rotation in polarization direction. Skilled workers will also understand that grey scale images may also be generated with LCDs 26 by employing methods in controller 49 that vary according to the specific type of LCDs. The grey scale imaging methods fall roughly into analog and digital classes. In analog LCD driving schemes, grey scales are typically achieved by driving the LCDs to a level between the dark and illuminated states to cause partial polarization phase retardation in the LCD. In digital LCD driving schemes, grey scales are typically achieved by employing pulse width modulation between the dark and illuminated states. However, this invention might best be understood from the following operational descriptions in which only the dark and illuminated pixel states are considered.

With respect to the dark state pixels, P-polarized first wavelength range light rays 38 impinging on dark state pixels of first LCD 26$_1$ are reflected without change in polarization direction and return as P-polarized first wavelength range light rays 38 along their original paths toward light source 14 through transflective polarizing beam splitter 40. S-polarized second and third wavelength range light rays 44 and 46 impinging on respective second and third LCDs 26$_2$ and 26$_3$ are reflected without change in polarization direction as S-polarized second and third wavelength range light rays 44 and 46, are recombined by pleochroic color filter 48, and return along their original paths toward light source 14 by reflecting off transflective polarizing beam splitter 40.

With respect to the illuminated state pixels, P-polarized first wavelength range light rays 38 impinging on illuminated state pixels on first LCD 26$_1$ are reflected with a 90° change in polarization direction as S-polarized first wavelength range light rays 50 that propagate toward transflective polarizing beam splitter 40. S-polarized first wavelength range light rays 50 strike transflective polarizing beam splitter 40, which reflects them toward projection lens 27. S-polarized second and third wavelength range light rays 44 and 46 impinging on respective second and third LCDs 26$_2$ and 26$_3$ are reflected with a 90° change in polarization direction as respective P-polarized second and third wavelength range light rays 52 and 54. P-polarized second and third wavelength range light rays 52 and 54 strike pleochroic color filter 48, which recombines and transmits them through transflective polarizing beam splitter 40 toward projection lens 27.

S-polarized first wavelength range light rays 50 and P-polarized second and third wavelength range light rays 52 and 54 are received by a spectrally selective output wave plate 56 that changes the polarization direction of S-polarized first wavelength range light rays 50 into alignment with the polarization direction of P-polarized second and third wavelength range light rays 52 and 54 to produce P-polarized first, second, and third wavelength range light rays 58. Spectrally selective output wave plate 56 is preferably of an optical retardation type. A "clean up" polarizer 60 positioned between spectrally selective output wave plate 56 and projection lens 27 color balances light rays 58 by correcting for non-ideal light transmission and reflection responses of transflective polarization beam splitter 40 affecting at least one of the first, second, and third modulated light output beams of different wavelength ranges or bands. Spectrally selective output wave plate 56 aligns the polarization direction of light rays 58 so that clean-up polarizer 60 will not block light in one of the wavelength bands. Spectrally selective output wave plate 56 and clean-up polarizer 60 cooperate to improve the color purity of this invention and may be omitted if color purity is not an issue.

Figure 2:
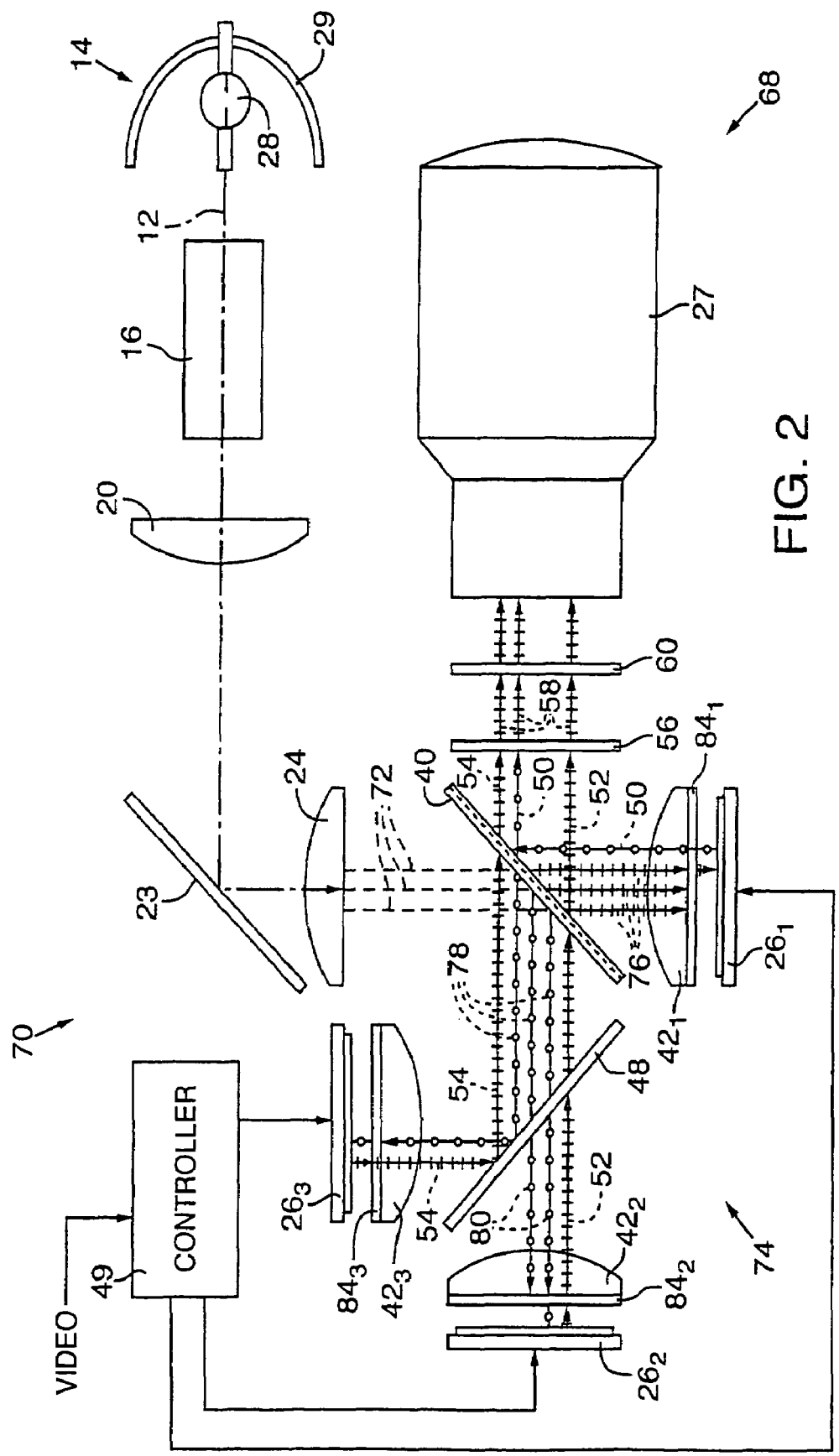
FIG. 2 is a simplified pictorial plan view of a multimedia projector showing a second embodiment of a projector optical system of this invention.

FIG. 2 shows an image projector 68 having an optical system 70 in accordance with a second preferred embodiment of this invention. Optical system 70 is constructed similarly to optical system 10 but includes neither polarization conversion prism assembly 22 nor spectrally selective input wave plate 36. Accordingly, randomly polarized first, second, and third wavelength range light rays 72 propagate toward a three-path reflective LCD assembly 74 and strike a transflective polarizing beam splitter 40. Randomly polarized first, second, and third wavelength range light rays 72 can be separated into P-polarized components 76 and S-polarized components 78. Transflective polarizing beam splitter 40 transmits P-polarized components 76 of first, second, and third wavelength range light rays 72 toward field lens 26$_1$ and reflects S-polarized components 78 of first, second, and third wavelength range light rays 72 toward pleochroic color filter 48. Pleochroic color filter 48 transmits S-polarized first and second wavelength range light rays 80 toward field lens 26$_2$ and reflects S-polarized third wavelength range light rays 82 toward field lens 26$_3$.

There is associated with each of field lenses 42 an optional dichroic trim filter coating 84$_1$, 84$_2$, and 84$_3$ (collectively "trim filters 84") placed at a convenient location in the light propagation paths of respective LCDs 26$_1$, 26$_2$, and 26$_3$. Trim filters 84 may be formed on separate substrates, directly on the windows of LCDs 26, or preferably on surfaces of field lenses 42 as shown. Trim filters 84 reflect selected wavelength ranges of light rays without changing their polarization directions, so the reflected light simply propagates in reverse direction along the same path toward light source 14 without reaching projection lens 27. Light rays having the desired wavelength range propagate through trim filters 84 for reflection off the pixels of LCDs 26. Skilled workers will recognize that trim filters 84 may be "tuned" to provide color balance and purity to the final projected image.

In particular, dichroic trim filter coating 84$_1$ receives P-polarized first, second, and third wavelength range light rays 76, reflects the second and third wavelength range light rays in reverse direction along the same propagation path toward light source 14 and transmits the first wavelength range light rays toward LCD 26$_1$. The first wavelength range light rays are received and reflected by LCD 26$_1$, with their polarization direction selectively changed or unchanged, depending whether the pixels are switched to a dark state or an illuminated state. The polarization directions of light rays reflected by the pixels the light rays strike causes the first wavelength light rays to either propagate toward light source 14 or reflect toward projection lens 27 as described for optical system 10. Likewise, dichroic trim filter coatings 84$_2$ and 84$_3$ placed in the paths of LCDs 26$_2$ and 26$_3$ have the same effect on the second and third wavelength ranges of light rays. In this way each of LCDs 26$_1$, 26$_2$, and 26$_3$ receives and reflects the respective first, second, and third wavelength ranges of light rays. Skilled workers will recognize that dichroic trim filter 84$_3$ is not required if pleochroic color filter 48 provides suitable third wavelength filtering characteristics.

Image projectors 8 and 68 have been described with reference to first, second, and third wavelength ranges of light rays. In the preferred embodiments these wavelength ranges correspond to those of the respective green, red, and blue primary colors.

Optical systems 10 and 70 are advantageous because they can support an f/2.0 optical path that provides 1,200 lumens of projected image brightness with a 270 watt lamp and 15 millimeter (0.6 inch) LCDs. 1,500 lumens are possible with 19.7 millimeter (0.774 inch) LCDs, and 1,700 lumens are possible with 24.6 millimeter (0.97 inch) LCDs. Projected image brightness can be tailored through selection of particular lamps, filter characteristics, polarizer characteristics, and various other optical path design details.

Optical systems 10 and 70 are further advantageous because they enable constructing reflective LCD-based multimedia projectors that are lighter, smaller, potentially less costly, and easier to implement than prior prism-based systems.

Skilled workers will recognize that various other portions of this invention may be implemented differently from the implementations described above for preferred embodiments. For example, skilled workers will understand that minor optical path variations and additions may be necessary to correct for astigmatism, color aberrations, and other distortions. Moreover, the wavelength ranges, filters, wave plates, and other optical components may employ a wide variety of characteristics, mounting positions, spacings, dimensions, and aspect ratios that are suited to particular displays, such as rear projection, higher resolution, video only, and entertainment applications.

It will be obvious to those having skill in the art that many changes may be made to the details of the above-described embodiments of this invention without departing from the underlying principles thereof. The scope of this invention should, therefore, be determined only by the following claims.

We claim:

1. A system, comprising:
   a light source capable of producing light in first, second and third wavelength bands in a second polarization direction;
   a transflective polarizing beam splitter comprising one of a wire grid device, a multi-layer thin film device, a cholesteric polymer liquid crystal device, a laminated polymer sheet device, or combinations thereof, the transflective polarizing beam splitter being capable of receiving the first, second, and third wavelength bands of light, the transflective polarizing beam splitter being further capable of transmitting the first wavelength band of light, in a first polarization direction, and capable of reflecting the second and third wavelength bands of light in a second polarization direction; and
   first, second and third reflective liquid crystal light valves capable of reflecting at least a portion of the respective first, second and third wavelength bands of light generally toward a projection lens.

2. The system according to claim 1, and further comprising a color filter capable of receiving the second and third wavelength bands of light; transmitting the second wavelength band of light, in the second polarization direction, and capable of reflecting the third wavelength band of light, in the second polarization direction.

3. The system according to claim 1, and further comprising a spectrally selective output device capable of receiving the first second, and third wavelength bands of light, said spectrally selective output device further capable of transmitting the first wavelength band of light in a first polarization direction and transmitting the second and third wavelength bands of light in the second polarization direction.

4. The system according to claim 1, and further comprising a light polarizing filter capable of correcting non-ideal light transmission and reflection characteristics of the transflective polarizing beam splitter.

5. The system according to claim 1, and further comprising one or more filters associated with one or more of the first, second, and third light valves, capable of reflecting or filtering wavelengths of light Without changing the polarization of the wavelengths of light.

6. The system according to claim 1, wherein one or more of the light valves comprises one or more pixels capable of being switched between a dark state and an illuminated state.

7. The system according to claim 6, and further comprising a controller coupled to at least one of the light valves capable of controlling the one or more pixels of the one or more light valves.

8. The system according to claim 1, wherein the first, second, and third wavelength bands comprise one of red, green, or blue wavelengths, and/or combinations thereof.

9. The system according to claim 1, wherein the one or more pixels of a light valve are capable of being switched to reflect portions of the first, second, or third wavelength band of light back toward the transflective polarizing beam splitter.

10. An apparatus, comprising:
    a light source capable of producing light in first, second and third wavelength bands;
    a plate-type transfiective polarizing beam splitter comprising one of a wire grid device, a multi-layer thin film device, a cholesteric polymer liquid crystal device, a laminated polymer sheet device, or combinations thereof, the plate-type transflective polarizing beam splitter being capable of receiving the first, second, and third wavelength bands of light, transmitting, in a first polarization direction, the first wavelength band of light, and reflecting, in a second polarization direction, the second and third wavelength bands of light; and
    first, second and third reflective liquid crystal light valves capable of reflecting at least a portion of the first, second and third wavelength bands of light generally toward a projection lens.

11. The apparatus according to claim 10, and further comprising a spectrally selective output device capable of receiving the first, second, and third wavelength bands of light; further capable of transmitting the first wavelength band of light in a first polarization direction; and capable of transmitting the second and third wavelength bands of light in the second polarization direction.

12. The appartatus according to claim 10, and further comprising a color filter capable of receiving the second and third wavelength bands of light transmitting, in the second polarization direction, the second wavelength band of light, and reflecting, in the second polarization direction, the third wavelength band of light.

13. The apparatus according to claim 10, and further comprising a light polarizing filter capable of correcting non-ideal light transmission and reflection characteristics of the transflective polarizing beam splitter.

14. The apparatus according to claim 10, and further comprising one or more filters associated with one or more of the first, second, and third light valves, capable of reflect or filter wavelengths of light without changing the polarization of the wavelengths of light.

15. The apparatus according to claim 10, wherein one or more of the light valves comprises one or more pixels capable of being switched between a dark state and an illuminated state.

16. The apparatus according to claim 15, and further comprising a controller coupled to at least one of the light valves capable of controlling the one or more pixels of the one or more light valves.

17. A system, comprising:
a video unit capable of outputting a signal; and
a projection system, coupled to the video unit, capable of receiving the outputted signal, and capable of projecting a video signal, said projection system comprising:
 a light source capable of producing light in first, second, and third wavelengths;
 a light, valve arrangement coupled to the light source, comprising
  a plate-type transflective polarizing beam splitter comprising one of a wire grid device, a multi-layer thin film device, a cholesteric polymer liquid crystal device, a laminated polymer sheet device, or combinations thereof,
  a color filter, and
  first, second and third reflective liquid crystal light valves; and
 a projection lens coupled to the reflective light valve arrangement.

18. The system according to claim 17, and further comprising a spectrally selective output device capable of receiving the first, second, and third wavelength bands of light; further capable of transmitting the first wavelength band of light in a first polarization direction; and capable of transmitting The second and third wavelength bands of light in the second polarization direction.

19. The system according to claim 17, and father comprising a light polarizing filter capable of correcting non-ideal light transmission and reflection characteristics of the transflective polarizing beam splitter.

20. The system according to claim 17, and further comprising one or more filters associated with one or more of the first, second, and third light valves, capable of reflect or filter wavelengths of light without changing the polarization of the wavelengths of light.

21. The system according to claim 17, wherein one or more of the light valves comprises one or more pixels capable of being switched between a dark state and an illuminated state.

22. The system according to claim 21, and further comprising a controller coupled to at least one of the light valves capable of controlling the one or more pixels of the one or more light valves.

23. A method, comprising:
producing light in first, second and third wavelength bands in a second polarization direction;
receiving, at a transflective polarizing beam splitter, the first, second, and third wavelengths of light the transflective polarizing beam splitter comprising one of a wire grid device, a multi-layer thin film device, a cholesteric polymer liquid crystal device, a laminated polymer sheet device, or combinations thereof;
transmitting, from the transflective polarizing beam splitter, the first wavelength of light, in a first polarization direction;
reflecting, from the transflective polarizing beam splitter, the second and third wavelength of light, in a second polarization direction; and
reflecting, by a first, second and third reflective liquid crystal light valves, portions of the respective first, second and third wavelengths of light generally toward a projection lens.

24. The method according to claim 23, and further comprising:
receiving, at a spectrally selective output device, the first, second, and third wavelengths of light;
transmitting, from the spectrally selective output device, the first wavelength of light in a first polarization direction; and
transmitting, from the spectrally selective output device, the second and third wavelengths of light in the second polarization direction.

25. The method according to claim 23, and further comprising:
receiving, by a filter, the second and third wavelengths of light;
transmitting, by the filter, the second wavelength of light, in the second polarization direction; and
reflecting, by the filter, the third wavelength of light, in the second polarization direction.

26. The method according to claim 23, and further comprising correcting non-ideal light transmission and reflection characteristics of the transflective polarizing beam splitter.

27. The method according to claim 23, and further comprising reflecting or filtering wavelengths of light without changing the polarization of the wavelengths of light.

28. An apparatus comprising:
a plate-type transflective polarizing beam splitter capable of receiving light from a light source, transmitting, in a first polarization direction, light in a first wavelength band toward a first light valve, and reflecting, in a second polarization direction, light in a second wavelength band and light in a third wavelength band;
a color filter capable of receiving the second and third wavelength bands, transmitting in the second polarization direction the second wavelength band toward a second light valve, and reflecting in the second polarization direction the third wavelength band toward a third light valve;
said first, second, and third reflective liquid crystal light valves capable of reflecting respective first, second, and third wavelength bands for selective transmission through a lens depending on whether the respective liquid crystal light valve is in a dark polarization state or an illuminated polarization state; and
a spectrally selective output device disposed between the plate-type transflective polarizing beam splitter and the lens to align to substantially a same polarization direction the first, second, and third wavelength bands of light directed toward the lens.

29. The apparatus of claim 28, wherein the first light valve reflects, in the second polarization direction, the first wavelength band of light from illuminated polarization state pixels and in which the reflected second polarization direction light reflects off the plate-type transflective polarizing beam splitter toward the lens.

30. The apparatus of claim 28, wherein the second light valve reflects, in the first polarization direction, the second wavelength band of light from illuminated polarization state pixels and in which the reflected first polarization direction light transmits through the color filter and transmits through the plate-type transflective polarizing beam splitter toward the projection lens.

31. The apparatus of claim 28, wherein the third light valve reflects, in the first polarization direction, the third wavelength band of light from illuminated polarization state pixels and in which the reflected first polarization direction light reflects off the color filter and transmits through the plate-type transflective polarizing beam splitter toward the projection lens.

32. The apapratus of claim 28, and further comprising a dichroic trim filter associated with multiple ones of the first, second, and third light valves, the dichroic trim filter reflecting selected wavelength bands of the light rays without changing their polarization direction.

33. The apparatus of claim 28, wherein the plate-type transflective polarizing beam splitter comprises a wire grid device, a multi-layer thin film device, a cholesteric polymer liquid crystal device, a laminated polymer sheet device, and/or combinations thereof.

* * * * *